INVENTORS
HUBERT G. DEVRIES
JACK D. WELCH
BY
Moody & Anderson
AGENTS

HIGH EFFICIENCY INSTRUMENT SERVO AMPLIFIER FOR MICROMINIATURIZATION

Filed Sept. 8, 1961

INVENTORS
HUBERT G. DEVRIES
JACK D. WELCH
BY Moody & Anderson
AGENTS

Nov. 5, 1963 J. D. WELCH ETAL 3,109,971

HIGH EFFICIENCY INSTRUMENT SERVO AMPLIFIER FOR MICROMINIATURIZATION

Filed Sept. 8, 1961 3 Sheets-Sheet 3

INVENTORS
HUBERT G. DEVRIES
JACK D. WELCH

BY Moody & Anderson

AGENTS

United States Patent Office 3,109,971
Patented Nov. 5, 1963

3,109,971
HIGH EFFICIENCY INSTRUMENT SERVO AMPLIFIER FOR MICROMINIATURIZATION

Jack D. Welch and Hubert G. De Vries, Cedar Rapids, Iowa, assignors to Collins Radio Company, Cedar Rapids, Iowa, a corporation of Iowa Filed Sept. 8, 1961, Ser. No. 136,859
15 Claims. (Cl. 318—30)

This invention relates generally to servo amplifiers of the phase-sensitive type and more particularly to a servo amplifier for the control of a two-phase servo motor of an improved type requiring minimum size with minimized power dissipation such that the entire amplifier lends itself to design concepts currently referred to as "microminiaturization."

Many electronic circuits lend themselves readily to design concepts which may be microminiaturized. The majority of these circuits are necessarily low-level circuits because of power dissipation considerations and have been restricted for applications in the R.F.-U.H.F. frequency spectrum because of the limitation of component sizes compatible with microminiaturization techniques. Recent advances, however, have made possible capacitors rated up toward one hundred microfarad-volts. These components have permitted audio amplifiers to be microminiaturized, but only in low power applications.

The particular object of the present invention is to provide an amplifier to drive both phases of a size 11 or smaller instrument servo motor. Because these servo motors may require approximately 2.5 watts of driving power per phase, and it may be necessary to hold power dissipation in the amplifier to less than one-half watt, the amplifier efficiency must be in excess of 90%. Servo amplifiers used extensively to drive both phases of a split phase servo motor employ normal linear output stages wherein power is dissipated at the null. The efficiency required in an amplifier which may be microminiaturized necessitates a departure from the widely used linear output stages and additionally requires elimination of transformers and/or relays because of the incompatibility of component size with the microminiaturization concept.

It is an object therefore of the present invention to provide an extremely miniature servo amplifier exhibiting a minimum of power dissipation.

Still a further object of the present invention is to provide a servo amplifier of sufficient power to drive an instrument servo motor and which is extremely miniature in size such that it might by physically enclosed within the instrument per se, with a volumetric requirement of considerably less than a cubic inch.

The invention is featured in the provision of a two-phase servo amplifier which dissipates no power in the driving stage under "null input" conditions and applies full power output in response to a minute input. These and other features and objects of the present invention will become apparent upon reading the following description in conjunction with the accompanying drawings in which.

As above mentioned, in the well-known linear servo amplifier, the majority of the power dissipation occurs in the output drive stage. Since the present invention is to provide a servo amplifier which may be microminiaturized and which, for example, might be enclosed in a hermetically sealed instrument housing, the employment of conventional linear servo amplifier techniques is not possible because of size and heat dissipation requirements. The present invention might be compared to a relay-type servo amplifier in that the output is not linear, but is either completely "off" or fully "on" in response to the absence or presence of input signals, respectively. Conventional relays, of course, would not lend themselves to inclusion because of their size. Since the present invention provides an amplifier which may be microminimized, solid-state switching techniques are incorporated. The output section of the present invention therefore operates as a controlled electronic switch, and, unlike conventional servo amplifiers which provide proportional control about the null, the present invention provides a narrow "dead" notch at the null point with maximum application of motor control voltage being applied abruptly on either side of the notch.

Figures 1, 2, 3:
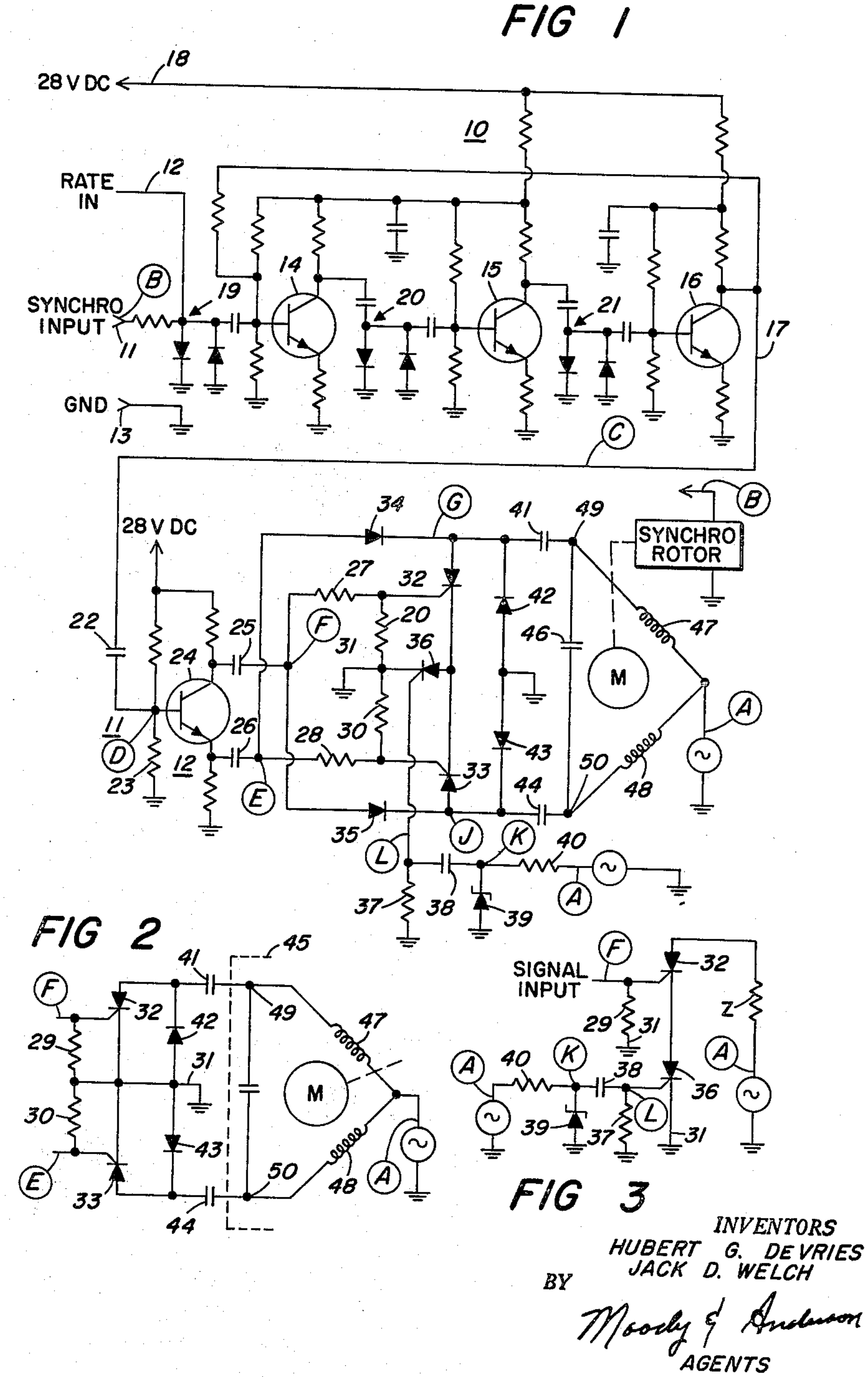
FIGURE 1 is a schematic diagram of an embodiment of the present invention.
FIGURE 2 is a simplified schematic of the output driving portion of the present invention.
FIGURE 3 is a simplified schematic of a portion of the control circuitry of FIGURE 1.

The general concept of the output section of the present invention is illustrated schematically in FIGURE 2. A split phase servo motor 45 is selectively energized by electronically placing its associated phase shifted capacitor 46 in series with one or the other of field windings 47 and 48, as concerns the energizing source designated as an alternating current source A. This general motor control concept has been employed in the art by various means including, for example, relays which might be connected to motor terminals 49 and 50 and which might be selectively energized to complete a circuit between terminals 49 and 50 to the ground return for the power source A. The present invention utilizes solid-state voltage controlled rectifiers 32 and 33 and associated diodes 42 and 43 to accomplish this objective in a unique manner.

Controlled rectifiers will fire at the instant a positive control voltage is applied to the gate electrode when the anode of the controlled rectifier is positive at the time. The rectifier continues to fire as long as its anode remains positive and ceases to fire when the anode is no longer positive. The controlled rectifier does not require the continued presence of the positive control voltage on the gate electrode to maintain firing. With reference then to FIGURE 2, control rectifiers 32 and 33 have their respective anodes connected through capacitors 41 and 44 to terminals 49 and 50 of the servo motor 45. The cathodes of controlled rectifiers 32 and 33 are connected in common to ground point 31 which is the common return for the motor supply voltage A. Control rectifiers 32 and 33 are respectively shunted by oppositely polarized conventional diodes 42 and 43. The control or gate electrodes of rectifiers 32 and 33 are returned to ground 31 through resistors 29 and 30, respectively. The basic operation of the output stage may be considered by assuming the presence of a positive signal E or F on one of the associated gate electrodes during the positive half cycle of the motor supply voltage A, in which case the particular rectifier switches to the conducting state and remains there for the duration of the half cycle. Thus, assuming control voltage F as being positive during the positive half cycle of motor supply voltage A, control rectifier 32 would switch to the conductive state and provide a low impedance path to ground 31 from terminal 49 of servo motor 45. Motor phase shifting capacitor 46 is thus serially connected with field winding 48 as concerns the supply voltage A, and motor 45 rotates in a predetermined direction. As controlled rectifier 32 conducts to provide this low impedance path to ground 31, the series capacitor 41 develops a charge which acts to forward bias diode 42 and energy is thus supplied to the motor 45 through conventional diode 42 during the ensuing one-half cycle of the motor supply voltage A. Similarly, should a positive gate voltage E occur during the positive half cycle of motor supply voltage A, controlled rectifier 33 switches to a conductive state to provide a low impedance path to ground 31 for terminal 50 of servo motor 45. In this latter situation the motor phase shifting capacitor 46 can seem to be serially connected with motor field winding 47 as concerns the supply voltage A and the servo motor is energized to rotate in the opposite direction. As in the first instance, when controlled rectifier 33 is firing, its associated series capacitor 44 develops a charge which acts to forward bias diode 44 and energy is thus supplied to the motor 45 through diode 43 during the ensuing one-half cycle of the motor supply voltage A. When neither of the control rectifiers 32 or 33 is receiving its positive control signal F and E, respectively, there is no conductive path to ground 31 for motor supply voltage A. Under this condition the series capacitors 41 and 44 charge to the peak value of the supply voltage A through the associated conventional diodes 42 and 43 and no power is supplied to motor 45.

Considering general operational characteristics, it is thus seen that the output stage of the present invention is in the form of a controlled electronic switch which, in response to positive input control voltages E and F, selectively grounds one or the other of motor terminals 49 and 50 to affect bidirectional drive of the motor 45. As will be further discussed, this type of control circuitry infers the presence of one or the other of positive input control voltages E and F. In the event of simultaneous presence of control voltages E and F, it is seen that both of the control rectifiers 32 and 33 would switch to a conductive state with the result that power would be supplied directly to both phases of the servo motor 45. Subsequent discussion in conjunction with the complete embodiment of FIGURE 1 will reveal a technique for obviating this dual firing condition.

FIGURE 1 illustrates a complete embodiment of the present invention wherein the output section is further refined from that illustrated in FIGURE 2. The circuitry is particularly adaptable to, but not necessarily limited to, operation with a synchro input and as illustrated in FIGURE 1, the motor 45 is seen to mechanically position a synchro rotor which develops an output voltage B (assuming other than a null condition) which is the input signal applied between input terminals 11 and 13 of the system of FIGURE 1. In a servo system employing synchro techniques, the control of phase throughout the system is essential to reliable operation. For this purpose, the present invention provides a multi-stage amplifier 10 in which the error voltage B developed in the synchro is successively amplified and phase-controlled. For the present it suffices to state that the output 17 from the amplifier 10 is precisely in phase with the motor supply voltage A or precisely 180° out of phase with motor supply voltage A. The particular aspects of the amplifier 10 towards attainment of this phase relationship will be further discussed. The output C from the amplifier 10, in accordance with the present invention, is applied through a differentiating network 11 comprised of capacitor 22 and resistor 23 to a phase splitter 12. The signal D on the base of the transistor 24 comprising this stage, is a phase reversible signal which leads or lags the motor reference voltage A by 90° so that it is maximum positive at the time the reference voltage A is going positive. The signal F from the collector of transistor 24 is reversed in phase from the input signal D while the signal E from the emitter of transistor 24 is in-phase with the input signal D.

Figure 4:
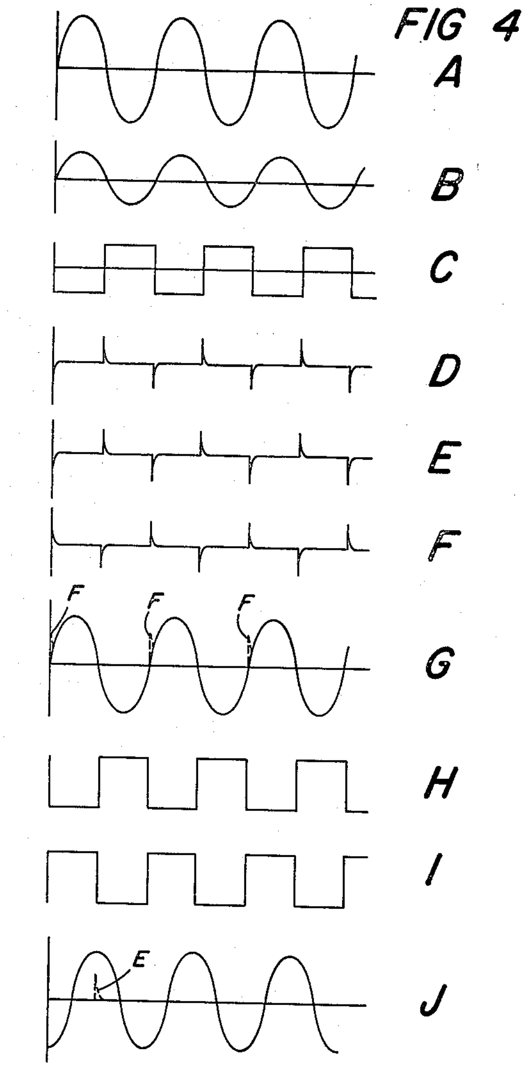
FIGURE 4 is a diagram showing operational waveforms throughout the embodiment of FIGURE 1.

FIGURE 4 illustrates the relationship between wave forms at the identified points of FIGURE 1. Waveform A corresponds to the motor supply voltage signal. Waveform B represents one of two phases of input signal to the amplifier 10, as developed in the synchro rotor. The output from amplifier 10 (waveform C) is indicated as being a square wave reversed in-phase from that of the amplifier input signal B. This phase reversal is apparent in the particular illustrated embodiment due to the inclusion of three stages of amplification in amplifier 10. Waveform C, as will be further discussed, might be a sinusoidal waveform rather than a square wave under certain input signal conditions. Whether waveform at C is sinusoidal or a square wave is immaterial as concerns the operation of the present invention. For the purpose of illustration, waveform C is illustrated as a square wave in which case waveform D is seen to be a differentiated form of waveform C, and waveforms E and F, which constitute the gating signals to controlled rectifiers 33 and 32 respectively, are seen to be respectively in-phase and 180° out of phase with the waveform D which appears at the base of phase splitter 12. Waveform G illustrates a voltage in phase with the motor supply voltage A, as it appears at the anode of control rectifier 32. It is seen that the positive spikes of waveform F are coincident with the leading edges of each positive half cycle of waveform G so that controlled rectifier 32 switches to the conductive state very early in the positive half cycle of motor supply voltage A. Waveform H represents the impedance of controlled rectifier 32 in its energized and unenergized states and it is seen that the impedance of controlled rectifier 32 is extremely low during the positive half cycles of waveform G during which time the controlled rectifier is firing. In the ensuing negative half cycles of anode voltage, control rectifier 32 ceases to be fired and its impedance is correspondingly high. Thus, with the particular input signal phase illustrated in waveform B, it is seen that controlled rectifier 32 is fired due to the presence of the positive spikes of control voltage F during the positive half cycles of the motor supply voltage A.

Considering again the signal D appearing on the base of the phase splitter 12; it was discussed that this signal is essentially reproduced on the emitter of transistor 24 as waveform E and appears phase reversed on the collector of transistor 24 as waveform F. While both waveforms E and F are shown to have positive and negative spikes, it is to be emphasized that any negative signal appearing on the gate electrode of the controlled rectifiers will be ignored by that component. Now again assuming an amplifier output of the particular phase illustrated in waveform C, it has been shown that the control gate waveform F resulting from this phase serves to fire controlled rectifier 32 into its conductive state during the positive half cycles of the motor control voltage A, since the anode voltage (waveform G) on controlled rectifier 32 would be in-phase with motor control voltage A. The negative half cycles of waveform G cause controlled rectifier 32 to be unenergized, and as illustrated in waveform I, diode 42 is biased by the charge on capacitor 41 in a forward direction so as to provide the low impedance path to ground 31 during the negative half cycles of the motor control voltage A. It is thus seen that for an input signal of the phase illustrated in waveform B, the motor 45 is caused to rotate in a given direction due to controlled rectifier 32 providing a low impedance path to ground 31 during the positive half cycles of the motor control voltage and the diode 32 providing the low impedance path to ground for the same motor terminal 49 during the ensuing negative half cycle of motor control voltage A.

As previously mentioned, it is imperative in the arrangement that one and only one of the controlled rectifiers 32 and 33 be fired at any given time. Should both of the controlled rectifiers 32 and 33 be fired simultaneously, both of the motor terminals 49 and 50 are provided with a low impedance path to ground and thus steps must be taken to prevent this situation from occurring under any circumstances.

Referring again to the waveforms of FIGURE 4, and further considering the control voltages E and F as being present on the control electrodes of the two controlled rectifiers, it would appear that waveform E would not cause a firing of controlled rectifier 33 with the particular input signal phase illustrated, since its positive peaks occur at the beginning of the negative half cycle of motor control voltage A. However, the anode voltage of control rectifier 33 (waveform J) is seen to be 90° out of phase with the reference waveform A since it is a voltage taken from the junction between motor winding 48 and phase shifting capacitor 46 which at this instant are serially connected across the motor control voltage A due to the firing of control rectifier 32. Now it is seen that the positive spikes of the waveform E appearing on the control electrode of controlled rectifier 33 appear during the positive peaks of the anode voltage J and, in the absence of preventive measures this would tend to fire controlled rectifier 33 at the beginning of the last half-cycle of the motor control voltage A and cause simultaneously excitation of both the motor fields during the ensuing time period. An analogous situation arises when considering a phase of synchro input voltage B opposite to that illustrated wherein the positive peaks of F would occur during the maximum positive peaks of the anode voltage of controlled rectifier 32 and tend to fire controlled rectifier 32 during the last half cycle of the motor supply voltage A. This dual firing situation is obviated by the inclusion of diverter diodes 34 and 35 which function to shunt to ground the positive gate signal which would normally cause the unwanted firing of the second controlled rectifier to ground. This shunt is completed through the conducting controlled rectifier and is uniquely ineffective as concerns the proper effect of control voltages E or F since the associated control rectifier is not fired. The inclusion of diverter diodes 34 and 35 thus uniquely render it impossible for a gating signal E or F to appear at one of the controlled rectifiers 32 or 33 while the other of the rectifiers is in the conducting state. Dual firing is thereby eliminated.

When considering the operation of the present invention in conjunction with a synchro developed input voltage, a still further refinement is incorporated in the present invention to insure that unwanted firing of both of the controlled rectifiers 32 and 33 is obviated. The input voltage B emanating from the synchro has been considered as zero under null conditions and as being either in-phase or out-of-phase with the motor control voltage A under conditions other than null. This definition is proper when one is considering the fundamental or intelligence component of the error signal developed in the synchro rotor. Most of the null voltage from a synchro is quadrature in nature. It is 90° out of phase with the fundamental or intelligence signal. The presence of quadrature voltage at intelligence signal null would normally present no problems in a conventional servo amplifier. The magnitude of the quadrature voltage appearing at the intelligence null is normally considered to be so minimal that it may be neglected. However, the present invention, in the amplifier section to be further discussed, may so amplify this minimal quadrature null voltage that it would be sufficient to fire one or the other of the control rectifiers 32 and 33 and render the null unstable. For this reason a further refinement of the basic control circuitry of the present invention is one of a coincident gate arrangement by which quadrature rejection is realized. The quadrature rejection circuitry is illustrated basically in FIGURE 3 in the form of a series coincident circuit which includes a third controlled rectifier 36. Essentially, controlled rectifier 36 is serially inserted between each of the controlled rectifiers 32 and 33 and ground 31. FIGURE 3 illustrates the controlled rectifier 36 as it acts in conjunction with controlled rectifier 32. The arrangement in the complete embodiment of FIGURE 1 is one of symmetry as concerns the other controlled rectifier 33. Controlled rectifier 36 functions in conjunction with controlled rectifiers 32 and 33 as an "and" gate. Controlled rectifier 36 must be fired simultaneously with one of the controlled rectifiers 32 or 33 to establish the necessary low impedance path to ground 31 for the motor controlled voltage A. In the simplified schematic of FIGURE 3, and with reference to the waveforms in FIGURE 5, the motor control voltage source A is utilized in conjunction with resistor 40 and zener diode 39 to generate a square wave which is in phase with motor control voltage A. This waveform is illustrated as waveform K in FIGURE 5. The voltage K is differentiated by the network comprised of capacitor 38 and resistor 37 to develop a voltage L which is applied to the control electrode of controlled rectifier 36. If now a gating pulse F (FIGURE 4) appears on the control electrode of controlled rectifier 32 while a positive pulse L appears at coincident controlled rectifier 36, both rectifiers 32 and 36 will switch to the conducting state and are maintained in this state for the remainder of the half cycle. If, however, either of the signals L or F is missing, there can be no low impedance path provided to ground 31 for the motor control voltage A, which appears as the anode reference voltage on controlled rectifier 32. Thus, even though quadrature input signals may be applied as input to amplifier 10 during the null of the synchro, these signals will form gates E′ and F′, which would tend to turn on controlled rectifiers 32 or 33 a quarter of a cycle out of time synchronization with the firing of coincidence controlled rectifier 36. Synchronism between the firing of the coincidence rectifier 36 and either of the control rectifiers 32 or 33 cannot be obtained and quadrature input signals are thus ineffective in energizing the motor 45.

Figure 5:
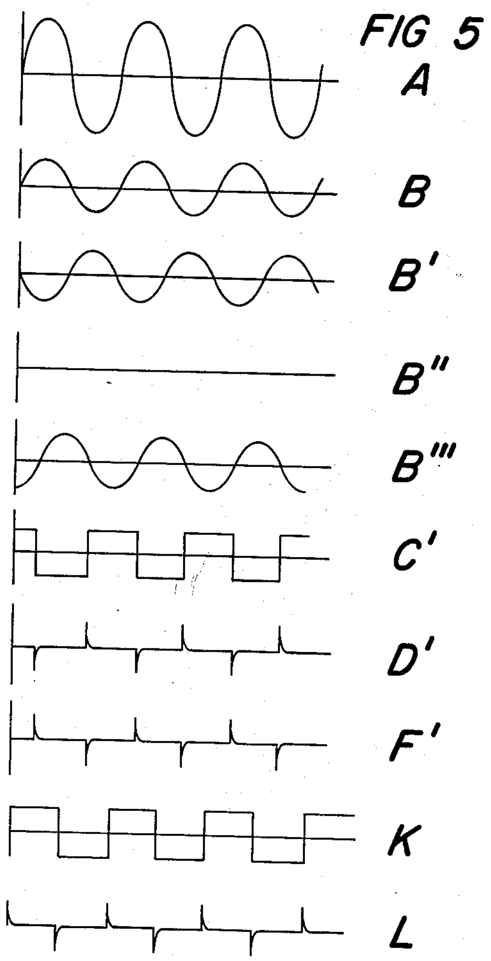
FIGURE 5 is a further diagram of waveforms illustrating the operational aspects of the embodiment of FIGURE 1.

The quadrature rejection principle is illustrated graphically in the waveforms in FIGURE 5 which includes motor control voltage A as the reference phase. Waveforms B and B′ might indicate the two phases of intelligence input signal which might be present at the input of the amplifier. Waveform B″ is suggestive of the intelligence null signal while waveform B‴ illustrates a quadrature voltage which may be presented to amplifier 10, even though the intelligence signal is nulled as at B″. The amplifier output is illustrated as waveform C′ and appears at the base of phase splitter 12 in differentiated form as waveform D′. It is to be noted that the reference waveform A is maximum positive at the positive peaks of the waveform F′, which is the gate applied to controlled rectifier 32. In the absence of the coincidence controlled rectifier 36, controlled rectifier 32 would be fired into its conductive state due to the gating waveform F′ stemming from an undesired quadrature null component. Note, however, that the generation of the reference square wave as illustrated by waveform K and the subsequent generation of the gating waveform L fires coincidence rectifier 36 a quarter cycle ahead of coincidence rectifier 32 and, in the absence of coincidence between these actions, no low impedance path is provided to ground to affect motor energization. While there is not coincidence between the presence of the positive peaks of the quadrature gating signal F′ and the coincidence gating signal L, it is noted that for desired conditions the gating signal F in FIGURE 4 is time coincident with the gating signal L of FIGURE 5 such that coincidence rectifier 36 is fired simultaneously with one of the coincidence controlled rectifiers 32 or 33 to provide the desired selective motor energization.

It should be noted that in the above description a particular one of the two possible phases of the input signal B has been chosen for illustration. Reversed phase of the input signal B would result in waveforms C, D, E and F being inverted with waveforms G, H, I, and J referring to controlled rectifier 33, diode 43, and controlled rectifier 32 respectively. As concerns the waveforms in FIGURE 5, an inverted phase of the quadrature component B''' would result in the waveform E gating controlled rectifier 33 and being out of phase with the coincidence gating signal L to obviate firing of controlled rectifier 33, while the gating waveform E of FIGURE 4 in this situation would be in time coincidence with the coincidence rectifying gating signal L with simultaneous fire of controlled rectifiers 33 and 36 to result in proper energization of servo motor 45 for reversed rotation.

It is seen from the above discussion that control of phase throughout the circuitry is of the essence. Exacting phase control permits of a precise null and stabilized operation. The primary considerations in the amplifier 10 are adequate gain, gain stability, and phase stability. Phase stability is more important here than in the customary servo amplifier since the peak of the alternating signal on the base of the phase splitter 12 must occur at precisely the time that the motor control voltage A is passing through zero in the positive-going direction. It is to be realized that some shifting of the phase of the synchro input signal B external to the amplifier per se may be necessary to assure precise phase lock between the output of the amplifier 10 and the reference signal A. To insure a correct phase relationship, amplifier 10 is comprised of the cascaded amplifying stages including transistors 14, 15 and 16. It is imperative that operation of each of the three stages be in the linear portion of its operating characteristic such that uneven clipping of the input signal due to saturation of one or more of the stages does not shift the phase reference of the input signal B during stages of amplification. It is to be realized that unsymmetrical clipping in the amplifier stages and subsequent capacitive coupling between stages would result in a shift of the phase reference. Each transistor should clip both top and bottom of the input signal thereto symmetrically. To obviate phase distortion, diode clipping is employed in the base circuit of each of the transistors 14 and 15 and 16. Each of the diode clipping arrangements 19, 20 and 21 is comprised of oppositely polarized diodes connected between the signal path and ground. The diodes clip the input signal to each stage at approximately 0.7 volt and it is thus possible to obtain a gain of approximately five in each transistorized amplifier stage without saturating any of the stages. Relatively large emitter resistors are employed in the stages to allow the transistors to be properly biased and to reduce the effect of transistor parameter changes and afford negative feedback on each stage for gain stability. A small amount of negative feedback is provided from the collector of transistor 16 to the base of transistor 14 for further gain stabilization. This arrangement provides maximum gain while obviating saturation in any of the stages so as to preserve the phase reference of the input signal B. For input signals B beneath a predetermined amplitude the output signal C from the third stage may be a sine wave. Input signals exceeding a predetermined magnitude may appear at the output of the amplifier as a precisely symmetrical square wave. The manner in which the control signals for the controlled rectifiers are developed from the amplifier output C is uniquely compatible with either a sine or square wave output from the amplifier 10, due to the inclusion of the differentiating network 11. Assuming the amplifier output C to be a sine wave, the signal B on the base of the phase splitter is a cosine wave and is maximum positive at the time the motor reference voltage A begins to go positive. Should the input signal to the amplifier be sufficient in magnitude, the amplifier output waveform C is a square wave and, after differentiation, appears at the base of the phase splitter 12 as a positive-going spike at this zero reference. Thus, the controlled rectifier gating voltages E and F are either a positive spike or a maximum positive co-sinusoidal wave at the beginning of the positive half cycle of the motor control voltage A; the latter establishing the phase reference throughout the system. The particular amplifier arrangement thus enables operation over an extremely wide dynamic range with assurance throughout of phase stability.

The present invention is seen to provide a servo amplifier arrangement utilizing solid state switching devices to permit selective energization of a servo motor in an exacting manner with a minimum of power dissipation. Since the system does not require the inclusion of relays or transformers of any type, the present invention permits of physical implementation utilizing microminiaturization techniques.

Although the present invention has been described with respect to a particular embodiment thereof, it is not to be so limited as changes might be made therein which fall within the scope of the invention as defined in the appended claims.

We claim:

1. A voltage controlled electronic switching means for selectively driving both phases of a split phase induction motor comprising, a source of reference motor drive signal having a predetermined frequency; means for developing first and second control voltages of opposed phase with one of said control voltages being 90 degrees out of phase with said reference signal; means for collectively reversing the respective phases of said control voltages; said servo motor having first and second field windings with first terminals thereof connected in common to a first junction, a phase shifting capacitor connected between the other terminals of said motor field windings; first and second voltage controlled rectifiers each having a cathode, an anode, and a control electrode; the anodes of said first and second controlled rectifiers being respectively connected through first and second capacitors to said other terminals of said motor field windings, the control electrodes of said first and second controlled rectifiers being respectively connected to said first and second control voltages, first and second unilateral conduction devices respectively shunting each of said first and second controlled rectifiers and being oppositely polarized with respect thereto, the cathodes of each of said controlled rectifiers connected in common to a second junction, said source of reference motor drive signal being connected between said first and second junctions, third and fourth unilateral conduction devices, each of said first and second control voltages connected serially with one of said third and fourth unilateral conduction devices and one of said first and second voltage controlled rectifiers respectively to said second junction, each of said third and fourth unilateral conduction devices being like polarized with respect to the associated one of said first and second controlled rectifiers and being connected to the one of said first and second control voltages which is effective in gating the disassociated one of said first and second voltage controlled rectifiers, whereby in the absence of said control voltages said motor is unenergized and in the presence of said control voltages motor rotation is effected in a direction defined by the respective phases of said control voltages with respect to said reference motor drive signal.

2. A voltage controlled electronic switching means for selectively driving both phases of a split phase induction motor comprising, a source of reference motor drive signal having a predetermined frequency; means for developing first and second control voltages of opposed phase with one of said control voltages being 90 degrees out of phase with said reference signal; means for collectively reversing the respective phases of said control voltages; said servo motor having first and second field windings with first terminals thereof connected in common to a first junction, a phase shifting capacitor connected between the other terminals of said motor field windings; first and second voltage controlled rectifiers each having a cathode, an anode, and a control electrode; the anodes of said first and second controlled rectifiers being respectively connected through first and second capacitors to said other terminals of said motor field windings, first and second unilateral conduction devices respectively shunting each of said first and second controlled rectifiers and being oppositely polarized with respect thereto, the cathodes of each of said controlled rectifiers connected in common to a second junction, said source of reference motor drive signal being connected between said first and second junctions, third and fourth unilateral conduction devices, each of said control voltages being connected to the control element of one of said first and second controlled rectifiers and additionally through one of said third and fourth unilateral conduction devices to the anode of the other of said first and second voltage controlled rectifiers, said third and fourth unilateral conduction devices being like polarized with respect to the associated one of said first and second controlled rectifiers, whereby in the absence of said control voltages said motor is unenergized and in the presence of said control voltages motor rotation is effected in a direction defined by the phases of said control voltages with respect to said reference motor drive signal.

3. Control means for driving both phases of a split-phase servo motor in response to error signal emanated from a synchro device positioned thereby comprising, amplifying means receiving said error signal, signal differentiating means receiving the output from said amplifying means, phase inverting means receiving the output from said differentiating means and developing first and second output control signals respectively in phase and 180 degrees out of phase with the input thereto, a source of alternating motor drive voltage having a predetermined frequency, means for energizing said synchro device at a like reference frequency; motor driving means comprising first and second voltage controlled rectifiers each having an anode, a cathode, and a control gate electrode, said first and second output control signals being respectively connected to the control electrodes of said first and second voltage controlled rectifiers, means respectively serially connecting a first terminal of said motor drive voltage through a first motor field winding and a first capacitor to the anode of the first controlled rectifier, means for respectively serially connecting said first terminal of said motor drive voltage through a second motor field winding and a second capacitor to the anode of the second controlled rectifier, the cathodes of said controlled rectifiers being commonly connected to the second terminal of said motor drive voltage and first and second unilateral conduction devices respectively shunting the said first and second controlled rectifiers with polarization opposite that of the associated one of said first and second controlled rectifiers.

4. Control means for driving both phases of a split-phase servo motor in response to error signal emanated from a synchro device positioned thereby comprising, amplifying means receiving said error signal, signal differentiating means receiving the output from said amplifying means, phase inverting means receiving the output from said differentiating means and developing first and second output control signals respectively in phase and 180 degrees out of phase with the input thereto, a source of alternating motor drive voltage having a predetermined reference frequency, means for energizing said synchro device at a like reference frequency; motor driving means comprising first and second voltage controlled rectifiers each having an anode, a cathode, and a control gate electrode, the outputs from said phase inverting means being respectively connected to the control electrodes of said first and second voltage controlled rectifiers, means respectively serially connecting a first terminal of said motor drive voltage through a first motor field winding and a first capacitor to the anode of the first controlled rectifier, means for respectively serially connecting said first terminal of said motor drive voltage through a second motor field winding and a second capacitor to the anode of the second controlled rectifier, the cathodes of said controlled rectifiers being commonly connected to the second terminal of said motor drive voltage, first and second unilateral conduction devices respectively shunting said first and second controlled rectifiers with polarization opposite that of the associated one of said first and second controlled rectifiers, third and fourth unilateral conduction devices, each of said first and second output control signals connected serially with one of said third and fourth unilateral conduction devices and one of said first and second voltage controlled rectifiers to said second terminal of said motor drive voltage, each of said third and fourth unilateral conduction devices being like polarized with respect to the associated one of the said first and second controlled rectifiers and being connected to the one of said first and second output control signals which is effective in gating the disassociated one of said first and second voltage controlled rectifiers.

5. Control means for driving both phases of a split-phase servo motor in response to error signal emanated from a synchro device positioned thereby comprising, amplifying means receiving said error signal, signal differentiating means receiving the output from said amplifying means, phase inverting means receiving the output from said differentiating means and developing first and second output control signals respectively in phase and 180 degrees out of phase with the input thereto, a source of alternating motor drive voltage having a predetermined reference frequency, means for energizing said synchro device at a like reference frequency; motor driving means comprising first and second voltage controlled rectifiers each having an anode, a cathode, and a control gate electrode, means respectively serially connecting a first terminal of said motor drive voltage through a first motor field winding and a first capacitor to the anode of the first controlled rectifier, means for respectively serially connecting said first terminal of said motor drive voltage through a second motor field winding and a second capacitor to the anode of the second controlled rectifier, the cathodes of said controlled rectifier connected to a common junction, gating means connected between said common junction and the second terminal of said motor drive voltage, means for opening said gating means for a predetermined time commencing with the start of each positive half cycle of said motor drive voltage with reference to the first terminal thereof; first and second unilateral conduction devices respectively connected from the anodes of said first and second controlled rectifiers to said common junction with polarization opposite that of the associated one of said first and second controlled rectifiers, third and fourth unilateral conduction devices, each of said output control signals being connected to the control element of one of said first and second controlled rectifiers and additionally through one of said third and fourth unilateral conduction devices to the anode of the other of said first and second voltage controlled rectifiers, said third and fourth unilateral conduction devices being like polarized as concerns the associated one of said first and second controlled rectifiers.

6. Control means as defined in claim 3 wherein said amplifying means comprises a plurality of cascaded amplifier stages each preceded by signal clipping means by which the input to each said cascaded section is limited to a predetermined level so as to obviate saturation and cut-off of said amplifier stages.

7. Control means as defined in claim 4 wherein said amplifying means comprises a plurality of cascaded amplifier stages each preceded by signal clipping means by which the input to each said cascaded section is limited to a predetermined level so as to obviate saturation and cut-off of said amplifier stages.

8. Control means as defined in claim 5 wherein said amplifying means comprises a plurality of cascaded amplifier stages each preceded by signal clipping means by which the input to each said cascaded section is limited to a predetermined level so as to obviate saturation and cut-off of said amplifier stages.

9. Electronic switching means for selectively controlling the energization of a split phase servo motor comprising an alternating source of motor drive voltage having a first terminal thereof connected to first ends of each of first and second motor field windings, a phase shifting capacitor connected across the second ends of each of said first and second motor field windings, first and second gated diode switching means respectively connected with like polarization between a common terminal and the second ends of each of said first and second motor field windings, first and second unilateral conduction devices connected respectively across said first and second diode switching means and in opposite polarization with respect thereto, means for generating first and second control voltages of periodicity like that of said motor drive voltage, said control voltages being individually 90 degrees out of phase with said motor control voltage and mutually 180 degrees out of phase; said source of motor drive voltage being connected between said common terminal and the first ends of each of said first and second motor field windings, third and fourth unilateral conduction devices, each of said control voltages connected serially with one of said third and fourth unilateral conduction devices and one of said first and second diode switching means to said common terminal, each of said third and fourth unilateral conduction devices being like polarized with respect to the associated one of the said first and second diode switching means and being connected to the one of said first and second control voltages which is effective in gating the disassociated one of said first and second diode switching means, and means for selectively reversing the respective phases of said first and second control voltages whereby a predetermined one of the second ends of said first and second motor field windings is provided with a low impedance path through one of said diode switching means to said common terminal.

10. An energizing control system for a two-phase induction motor, said motor including first and second field windings, said system comprising a phase shifting capacitor connected across first ends of each of said motor field windings, a source of motor drive voltage of predetermined frequency having one terminal thereof connected to the second ends of each of said motor field windings; first and second voltage controlled rectifiers each having anode, cathode and control electrodes, first and second capacitors, each of the first terminals of said motor field windings respectively serially connected through one of said first and second capacitors and the anode and cathode electrodes of one of said voltage controlled rectifiers to a second terminal of said motor drive voltage; first and second unilateral conduction devices respectively shunting said first and second controlled rectifiers and being oppositely polarized with respect to the associated one of said first and second controlled rectifiers, means for developing first and second control voltages having a periodicity like that of said motor drive voltage and being mutually opposite in phase and collectively 90 degrees out of phase with said motor drive voltage, third and fourth unilateral conduction devices, each of said control voltages connected serially with one of said third and fourth unilateral conduction devices and one of said first and second voltage controlled rectifiers to said second terminal of said motor drive voltage, each of said third and fourth unilateral conduction devices being like polarized with respect to the associated one of said first and second controlled rectifiers and being connected to the one of said first and second control voltages which is effective in gating the disassociated one of said first and second voltage controlled rectifiers, and means for reversing the respective phases of each of said control voltages whereby a predetermined different direction of rotation of said motor is effected.

11. An energizing control system for a two-phase induction motor, said motor including first and second field windings, said system comprising a phase shifting capacitor connected across first ends of each of said motor field windings, a source of motor drive voltage of predetermined frequency having one terminal thereof connected to the second ends of each of said motor field windings; first and second voltage controlled rectifiers each having anode, cathode and control electrodes, first and second capacitors, each of the first terminals of said motor field windings serially connected through one of said first and second capacitors and the anode and cathode electrodes of one of said first and second voltage controlled rectifiers to a common junction; gating means connected between said common junction and the second terminal of said motor drive voltage, means for opening said gating means for a predetermined time commencing with the start of each positive half cycle of said motor supply voltage with reference to the first terminal drive voltage; first and second unilateral conduction devices respectively connected between the anodes of said first and second controlled rectifiers and said second terminal of said motor drive voltage and being oppositely polarized with respect to the associated one of said first and second controlled rectifiers, means for developing first and second control voltages having a periodicity like that of said motor drive voltage and being mutually opposite in phase and collectively 90 degrees out of phase with said motor drive voltage, third and fourth unilateral conduction devices, each of said first and second control voltages being connected to the control element of one of said first and second controlled rectifiers and additionally through one of said third and fourth unilateral conduction devices to the anode of the other of said first and second voltage controlled rectifiers, said third and fourth unilateral conduction devices being like polarized with respect to the associated one of said first and second controlled rectifiers, and means for collectively reversing the phases of each of said control voltages whereby the respective phases thereof effect predetermined different directions of rotation of said motor.

12. An energizing control system for a two-phase induction motor, said motor including first and second field windings; said system comprising a phase shifting capacitor connected across first ends of each of said motor field windings, a source of motor drive voltage of predetermined frequency having one terminal thereof connected to each of the second ends of said motor field windings; first and second voltage controlled rectifiers each having anode, cathode and control electrodes, first and second capacitors, each of the first terminals of said motor field windings respectively serially connected through one of said first and second capacitors and the anode and cathode electrodes of one of said voltage controlled rectifiers to a second terminal of said motor drive voltage; first and second unilateral conduction devices respectively shunting said first and second controlled rectifiers and being oppositely polarized with respect to the associated one of said first and second controlled rectifiers, control means comprising means for selectively developing first and second control voltages as periodic signals mutually opposed in phase and collectively 90 degrees displaced with respect to the phase of said motor drive voltage, means for selectively applying each of said control voltages to one of said controlled rectifier control electrodes, third and fourth unilateral conduction devices, each of said control voltages connected serially with one of said third and fourth unilateral conduction devices and one of said first and second voltage controlled rectifiers to said second terminal of said motor drive voltage, each of said third and fourth unilateral conduction devices being like polarized with respect to the associated one of the said first and second controlled rectifiers and being connected to the one of said first and second control voltages which is effective in gating the disassociated one of said first and second voltage controlled rectifiers; means for mutually reversing the relative process of said first and second control voltages, a first control voltage relative phase relationship effecting the gating of one of said controlled rectifiers into a conductive state for the first half cycle of each cycle of said motor drive voltage, a second control voltage relative phase relationship effecting the gating of the other of said controlled rectifiers into a conductive state for the last half of each cycle of said motor drive voltage, the conductive one of said controlled rectifiers providing a low impedance path from a predetermined one of said first terminals of said motor field windings to said second terminal of said motor drive voltage.

13. An energizing control system for a two-phase induction motor, said motor including first and second field windings; said system comprising a phase shifting capacitor connected across first ends of each of said motor field windings, a source of motor drive voltage of predetermined frequency having one terminal thereof connected to each of the second ends of said motor field windings; first and second voltage controlled rectifiers each having anode, cathode and control electrodes, first and second capacitors, each of the first terminals of said motor field windings serially connected through one of said first and second capacitors and the anode and cathode electrodes of one of said first and second voltage controlled rectifiers to a common junction; gating means connected between said common junction and the second terminal of said motor drive voltage means for opening said gating means for a predetermined time commencing with the start of each positive half cycle of said motor supply voltage with reference to the first terminal of said motor drive voltage; first and second unilateral conduction devices respectively connected between the anodes of said first and second controlled rectifiers and said second terminal of said motor drive voltage and being oppositely polarized with respect to the associate one of said first and second controlled rectifiers, control means comprising means for selectively developing first and second control voltages as periodic signals mutually opposed in phase and collectively 90 degrees displaced with respect to the phase of said motor drive voltage, third and fourth unilateral conduction devices, each of said control voltages being connected to the control element of one of said first and second controlled rectifiers and additionally through one of said third and fourth unilateral conduction devices to the anode of the other of said first and second voltage controlled rectifiers, said third and fourth unilateral conduction devices being like polarized with respect to the associated one of said first and second controlled rectifiers; means for mutually reversing the relative phases of said first and second control voltages, a first control voltage relative phase relationship effecting the gating of one of said first and second controlled rectifiers into a conductive state for the first half cycle of each cycle of said motor drive voltage, a second control voltage relative phase relationship effecting the gating of the other of said first and second controlled rectifiers into a conductive state for the last half of each cycle of said motor drive voltage, the conductive one of said first and second controlled rectifiers providing a low impedance path from a predetermined one of said first terminals of said motor field windings to said second terminal of said motor drive voltage.

14. Means for selectively energizing a two phase servo motor of the type including first and second field windings and a phase shifting capacitor connected between first ends of said field windings; said means comprising electronic switching means for selectively connecting each of the first ends of said motor field windings to a common return for a motor supply signal source, the other terminal of said signal source being connected to the second ends of said motor field windings; said electronic switching means comprising a capacitor and voltage controlled rectifier respectively serially connected between a first end of one of said motor field windings and said common return, a second capacitor and second voltage controlled rectifier respectively serially connected between the first end of the other of said motor field windings and said common return, first and second unilateral conduction devices respectively shunting ones of each of said first and second voltage controlled rectifiers and being oppositely polarized with respect to the associated one thereof; control means for rendering a selected one of said controlled rectifiers conductive to the exclusion of the other comprising means for generating first and second gating signals, means connecting said first and second gating signals respectively to said first and second controlled rectifiers, said gating signal generating means including means for controlling said gating signals as periodic functions of the frequency of said motor supply signal, said gating signals being mutually opposite in phase and collectively 90 degrees displaced in phase with respect to said motor supply signal; third and fourth unilateral conduction devices, each of said first and second gating signals connected serially with one of said third and fourth unilateral conduction devices and one of said first and second voltage controlled rectifiers to said common return, each of said third and fourth unilateral conduction devices being like polarized with respect to the associated one of the said first and second controlled rectifiers and being connected to the gating signal which is effective in gating the disassociated one of said first and second voltage controlled rectifiers.

15. Means for selectively energizing a two phase servo motor of the type including first and second field windings and a phase shifting capacitor connected between said first ends of said field windings; said means comprising electronic switching means for selectively connecting each of the first ends of said motor field windings to a common return for a motor supply signal source, the other terminal of said signal source being connected to the second ends of said motor field windings; said electronic switching means comprising a capacitor and voltage controlled rectifier respectively serially connected between a first end of one of said motor field windings and a common junction, a second capacitor and second voltage controlled rectifier respectively serially connected between the first end of the other of said motor field windings and said common junction; a third voltage controlled rectifier connected between said common junction and said motor supply signal common return, said third voltage controlled rectifier being polarized like said first and second controlled rectifiers with respect to said motor supply signal terminals, means controlled by the periodicity of said motor supply signal for rendering said third voltage controlled rectifier conductive for a predetermined portion of each half cycle of said motor supply signal commencing with the start of each positive half cycle thereof; first and second unilateral conduction devices respectively connected between the anode of each of said first and second voltage controlled rectifiers and said motor supply signal common return and being oppositely polarized with respect to the associated one of said first and second controlled rectifiers; control means for rendering a selected one of said first and second controlled rectifiers conductive to the exclusion of the other comprising means for generating first and second gating signals, said gating signal generating means including means for controlling said gating signals as periodic functions of the frequency of said motor supply signal, said gating signals being mutually opposite in phase and collectively 90 degrees displaced in phase with respect to said motor supply signal; third and fourth unilateral conduction devices, each of said gating signals being connected to the control element of one of said first and second controlled rectifiers and additionally through one of said third and fourth unilateral conduction devices to the anode of the other of said first and second voltage controlled rectifiers, said third and fourth unilateral conduction devices being like polarized with respect to the associated one of said first and second controlled rectifiers.

References Cited in the file of this patent

UNITED STATES PATENTS

| | | |
|---|---|---|
| 2,627,594 | Sawyer et al. | Feb. 3, 1953 |
| 2,677,086 | McAdie | Apr. 27, 1954 |